United States Patent
Weires et al.

(10) Patent No.: US 9,719,839 B2
(45) Date of Patent: Aug. 1, 2017

(54) OCCUPANT SENSOR AND SEAT WITH SUCH AN OCCUPANT SENSOR

(71) Applicant: IEE INTERNATIONAL ELECTRONICS & ENGINEERING S.A., Echternach (LU)

(72) Inventors: Konstantin Weires, Kruchten (DE); Dietmar Jungen, Mehren (DE); Claus-Christian Kedenburg, Konz (DE); Manuel Wampach, Junglinster (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 15/119,659

(22) PCT Filed: Feb. 9, 2015

(86) PCT No.: PCT/EP2015/052641
§ 371 (c)(1),
(2) Date: Aug. 17, 2016

(87) PCT Pub. No.: WO2015/121197
PCT Pub. Date: Aug. 20, 2015

(65) Prior Publication Data
US 2017/0010150 A1 Jan. 12, 2017

(30) Foreign Application Priority Data
Feb. 17, 2014 (LU) .......................................... 92378

(51) Int. Cl.
*G01L 1/04* (2006.01)
*G01G 19/414* (2006.01)
(Continued)

(52) U.S. Cl.
CPC ......... *G01G 19/4142* (2013.01); *B60N 2/002* (2013.01); *G01L 1/22* (2013.01)

(58) Field of Classification Search
CPC ......... G01G 9/4142; B60N 2/002; G01L 1/22
(Continued)

(56) References Cited

U.S. PATENT DOCUMENTS 7,134,715 B1  11/2006 Fristedt et al.
9,242,450 B2 *  1/2016 Noricks ............... B44C 1/1712
(Continued)

FOREIGN PATENT DOCUMENTS

WO    WO0206083 A1    1/2002

OTHER PUBLICATIONS

Luxembourg Search Report for LU application No. 92378, dated Jul. 23, 2014, 8 pages.
(Continued)

*Primary Examiner* — Max Noori
(74) *Attorney, Agent, or Firm* — Reising Ethington P.C.

(57) ABSTRACT

An occupant sensor having a switching element, which comprises a top carrier layer and a bottom carrier layer separated by a spacer. The spacer has an opening defining an active zone in which the carrier layers may be brought together in response to a force acting on at least one of them. The switching element includes a first electrode and a second electrode arranged within the active area between the carrier layers such that an electrical contact is established between the first and second electrodes if the carrier layers are brought together. The occupant sensor includes a decoupling layer arranged on a top side of the switching element such that the decoupling layer covers the top carrier layer in the region of the active area. The decoupling layer and switching element are laterally displaceable with respect to each other in the region of the active area.

10 Claims, 1 Drawing Sheet

(51) Int. Cl.
*B60N 2/00* (2006.01)
*G01L 1/22* (2006.01)

(58) Field of Classification Search
USPC .............................. 73/818, 862.627, 862.381
See application file for complete search history.

(56) References Cited

U.S. PATENT DOCUMENTS

| | | | | |
|---|---|---|---|---|
| 2006/0278513 | A1* | 12/2006 | Kawahira | B60N 2/002 200/512 |
| 2008/0073130 | A1 | 3/2008 | Bulgajewski et al. | |
| 2008/0128258 | A1* | 6/2008 | Wittkowski | H01H 3/141 200/85 A |
| 2008/0253085 | A1* | 10/2008 | Soffer | G06F 1/18 361/679.4 |
| 2010/0001962 | A1* | 1/2010 | Doray | G06F 3/0317 345/173 |
| 2015/0001650 | A1* | 1/2015 | Matsunami | G01L 9/0055 257/417 |

OTHER PUBLICATIONS

International Search Report for International application No. PCT/EP2015/052641, dated Mar. 27, 2015, 3 pages.
Written Opinion for International application No. PCT/EP2015/052641, dated Mar. 27, 2015, 5 pages.

* cited by examiner

OCCUPANT SENSOR AND SEAT WITH SUCH AN OCCUPANT SENSOR

TECHNICAL FIELD

The present invention generally relates to the technical field of occupant sensor systems to be integrated into a seat; e.g. of an automotive vehicle. In a specific application, the present invention more specifically relates to the technical field of foil type pressure sensor based seat occupancy sensors; e.g. for use in a safety system of an automotive vehicle.

BACKGROUND ART

Seat occupancy sensors are commonly used in automotive vehicles for purposes of airbag control or other applications. In general, seat occupancy sensors present a plurality of switching elements, arranged in an array configuration and distributed over the surface of the vehicle seat. The individual switching elements are typically configured as simple on/off switches or as pressure sensing elements, e.g. force sensing resistors, in which, above a certain threshold force, an electrical resistance continuously varies with the force acting on the seat.

In a possible application of those seat occupancy sensors, an actual seat occupancy status is determined by means of the seat occupancy sensors and, in case of a car crash situation, the airbags associated with the respective seat are deployed only if the actual seat occupancy status requires such deployment. In a different application, the signal of the seat occupancy sensors are used in a seat belt warning system for generating a warning signal if a specific vehicle seat is occupied and the corresponding seat belt is not fastened.

In order to reliably detect if an occupant exerts a pressure on the seat, the pressure sensors have usually interposed between the seat cushion (of the seating surface or of the backrest) and the seat cover or seat trim to detect the occupancy state of a vehicle seat. If the seat is also equipped with a seat heater, the pressure sensor is usually arranged beneath the seat heater, i.e. between the seat heater layer and the seat cushion.

Now a considerable number of seats are manufactured by gluing the trim and/or the seat heater layer to the underlying seat cushion. In this case, the seat heater layer, if required, and the trim are assembled onto the seat cushion together with a thermosettable bonding agent between the different layers. The assembly is subsequently subjected to heating and pressure in order to activate the glue and to bond the different layers together substantially on their entire surface.

During this thermosetting stage, a pressure sensor arranged below the trim or immediately below the heater layer is exposed to rather harsh conditions which may damage the pressure sensor. Furthermore, once the assembly is set, the pressure sensor is fixedly located and may thus no longer adapt its position to a deformation of the seat caused by an occupant.

SUMMARY

It is an object of the present invention to provide an improved sensor arrangement adapted to be used in the above mentioned seats. The object is achieved by the invention as claimed in claim 1.

An occupant sensor comprises at least one switching element for detecting a force acting on the seat. The switching element comprises a top carrier layer and a bottom carrier layer arranged at a certain distance from one another by means of a spacer. The spacer comprises at least one opening defining an active zone of said switching element in which said top and bottom carrier layers may be brought together in response to a force acting on at least one of said top and bottom carrier layers. The switching element further comprises an electrode arrangement comprising at least a first electrode and a second electrode arranged within said active area of said switching element between said top and bottom carrier layers in such a way that an electrical contact is established between said first and second electrode if said top and bottom carrier layers are brought together in response to a force acting on at least one of said top and bottom carrier layers. In accordance with one aspect of the invention, the occupant sensor further comprises a decoupling layer of a flexible material, said decoupling layer being arranged on a top side of said switching element in such a way that said decoupling layer covers the top carrier layer at least in the region of the active area, wherein the arrangement is such that said decoupling layer and switching element are laterally displaceable with respect to each other at least in the region of the active area.

If the occupant sensor is integrated into a seat with thermobonded trim or seat heater, the decoupling layer, which is arranged on the top side of the switching element, will prevent the switching element itself to be glued on its surface to the overlying seat assembly layer, such as the seat trim, a felt layer, a plastic layer or the seat heater layer arranged above the occupant sensor. During the above described thermosetting stage, the decoupling layer will instead be bonded to the overlying layer.

After the assembly, the lateral displaceability between the switching element and the decoupling layer will enable the switching element to slide laterally to a certain extend between the decoupling layer and the seat cushion so as to adjust its position in accordance with a seat deformation.

Furthermore, during the thermosetting stage, the decoupling layer partially shields the switching element from the high temperature and pressure exerted onto the seat during thermosetting of the bonding agent. Accordingly damaging of the switching element during this assembly step may be advantageously prevented by the decoupling layer.

It will be noted that due to the flexibility of the decoupling layer, i.e. as the decoupling layer is of flexible material, a local pressure exerted on the seat by a passenger will be transferred by the decoupling layer to the underlying switching element and thus a detection of occupancy by means of the switching element is reliably given.

In a preferred embodiment, a lateral dimension of said decoupling layer is at least slightly larger than a lateral dimension of said top carrier foil at least in the region of the active area. This embodiment effectively ensures that the switching element will not extend laterally beyond the decoupling layer and thus may not be bonded to the overlying seat layer during the thermosetting stage. Furthermore the lager dimension of the decoupling layer provides for the required space in which the switching element may be freely displaced with respect to the decoupling layer.

It should be noted that the decoupling layer may be entirely separate from the switching element. In this case, the decoupling layer is placed on top of the switching element during the seat assembly prior to the arrangement of the next seat layer. In a preferred embodiment however, said decoupling layer is locally attached to the top carrier layer in a region remote from the active area. The decoupling layer may e.g. be attached to a connection tab of the switching element, i.e. at a location which is distant to the active areas. By such a local attachment in a region remote from the active areas, the occupant sensor forms a single piece which substantially improves the handling of the occupant sensor while at the same time the lateral displaceability of the switching element with respect to the flexible decoupling layer is maintained, also due to the flexibility of the decoupling layer. It will be noted that the decoupling layer may be attached to the top carrier layer by any suitable means, such as by gluing or crimping. Alternatively the decoupling layer may be mechanically fastened by design.

It will be appreciated, that the switching element advantageously comprises a plurality of active areas arranged between common top and bottom carrier layers and that said decoupling layer is arranged to cover the top carrier layer in the region of said plurality of active areas. The arrangement is preferably such that the different active areas of said plurality of active areas are distributed over a larger region, such that detection of occupancy is enhanced over a larger region of the seat.

The switching element is preferably configured as a foil-type pressure sensor and the top carrier layer and/or the bottom carrier layer is/are preferably made of a polymer foil.

Foil-type or film-based pressure sensors, i.e. pressure transducers converting pressure acting onto a flexible film into an electrical signal, are widely known and exist in a number of variants.

A widespread variant of a film-based pressure sensor comprises a first flexible carrier film and a second flexible lower carrier foil arranged at a certain distance from each other by means of a spacer (e.g. a double-sided adhesive film). The spacer is provided with one or more openings (regions devoid of spacer material) that define cells or cavities. In each of these cells or cavities, at least two electrodes are arranged in such a way that, in response to a pressure acting on the pressure sensor, the first and second carrier films are pressed together against their resiliency, causing the electrical resistance between the at least two electrodes of the cell to drop. A control unit connected to the pressure sensor measures the resistance (or the current or the voltage) between the electrodes of the cells and so determines the pressure acting on the pressure sensor.

Several possible arrangements of the electrodes in the individual cells are known. In a first arrangement, a first electrode is arranged on the first carrier film and a second electrode is arranged on the second carrier film in facing relationship with the first electrode. When the first and second carrier films are pressed together, an electrical contact is established between the first and second electrodes. Cells of this type are frequently called "through mode" cells. In an alternative arrangement, a first and a second electrode are arranged in spaced relationship on one of the first and second carrier films, while the other carrier film is covered with a shunt element. The shunt element is arranged in facing relationship to the first and second electrodes such that, when the first and second carrier films are pressed together, the shunt element shunts the first and second electrodes. Cells of this type are called "shunt mode" cells.

The cells may be configured as simple pressure switches. In this case the drop in electrical resistance occurs abruptly at a precise pressure threshold (changing from an insulator-like resistance to a conductor-like resistance), when the first and second electrodes are brought into physical contact with each other.

Alternatively, the cells may be configured in such a way that the resistance drops gradually over a broad pressure range. To achieve this, pressure-sensitive material prevents direct contact of the electrodes in the cell. The resistance of the pressure-sensitive material varies with applied pressure. Pressure sensitive material may be present as a layer on at least one of the electrodes, or, in case of a shunt-mode cell, the shunt element may be made of pressure sensitive material.

The above-described pressure sensors can be manufactured cost-effectively and have proven to be robust and reliable in practice. Thanks to these properties, film-based pressure sensors are nowadays widely used in all kinds of switching and measurement applications. The sensors offer a very slim profile and low weight, which makes them suitable for integration in various operating environments.

In a preferred embodiment of the invention, said decoupling layer is made of a polymer foil or a textile material. In case of a polymer material, the decoupling layer may be made of the same polymer material than the carrier foils, or from a different material. Also the thickness of the decoupling layer may be equal to or different from a thickness of the carrier foils.

Another aspect of the invention relates to a seat assembly comprising a seat cushion, a seat cover and at least one occupant as described above, wherein the at least one occupant sensor is arranged between a seat cushion and an overlying seat assembly layer. After the seat assembly, the decoupling layer of said at least one occupant sensor is at least partially bonded to overlying seat assembly layer. The overlying seat assembly layer may be the seat trim, a felt layer, a seat heater layer or any other layer constituting the entire seat assembly. If the seat assembly comprises a seat heater, the decoupling layer of said at least one occupant sensor is for instance preferably at least partially bonded to said seat heater layer.

It will be noted, that the seat occupancy sensor may be used for any suitable seat, such as a seat of an automotive vehicle like a car, a train, a plane or a bus. Also the occupant sensor may be integrated into the seating surface of such a seat or into the corresponding backrest section of the seat.

BRIEF DESCRIPTION OF THE DRAWINGS

A preferred embodiment of the invention will now be described, by way of example, with reference to the accompanying drawings, which show.

DESCRIPTION OF PREFERRED EMBODIMENTS

Figure 1:
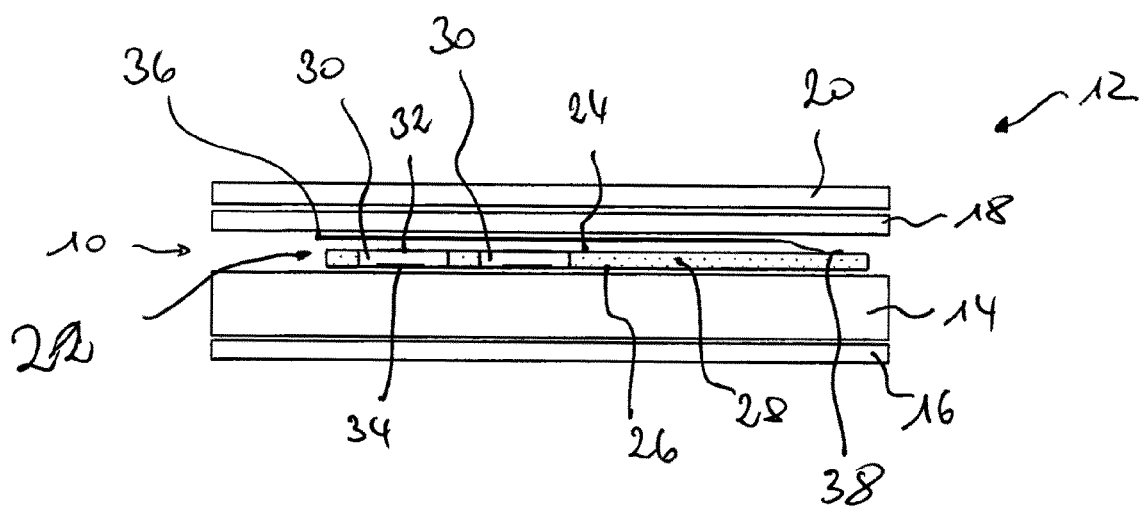
FIG. 1: a schematic layer assembly of a seat comprising an occupant detector in accordance with the teaching of the present invention.

FIG. 1 shows an occupant sensor 10 integrated into a schematic layer assembly of a seat. The seat comprises a seat cushion 14 placed on a seat frame 16. An occupant sensor 10 is placed on the seat foam or seat cushion 14 and covered by a seat heater layer 18 and the seat trim 20.

The occupant sensor comprises a switching element 22 for detecting a force acting on the seat. The switching element 22 comprises a top carrier layer 24 and a bottom carrier layer 26 arranged at a certain distance from one another by means of a spacer 28. In the shown embodiment, the spacer 28 comprises two openings 30 defining an active zone of said switching element 22 in which said top and bottom carrier layers may be brought together in response to a force acting on at least one of said top and bottom carrier layers. The switching element further comprises an electrode arrangement comprising a first electrode 32 and a second electrode 34 arranged within said active area 30 of said switching element 22 between said top and bottom carrier layers in such a way that an electrical contact is established between said first and second electrode if said top and bottom carrier layers are brought together in response to a force acting on at least one of said top and bottom carrier layers.

The occupant sensor further comprises a decoupling layer 36 of a flexible material which is arranged on a top side of said switching element 22 in such a way that the decoupling layer 36 covers the top carrier layer 24 at least in the region of the active area 30. The decoupling layer is separate from the top carrier layer 24 at least in the region of the active area 30 such that the arrangement is such that said decoupling layer 36 and switching element 22 are laterally displaceable with respect to each other at least in the region of the active area 30.

Figure 2:
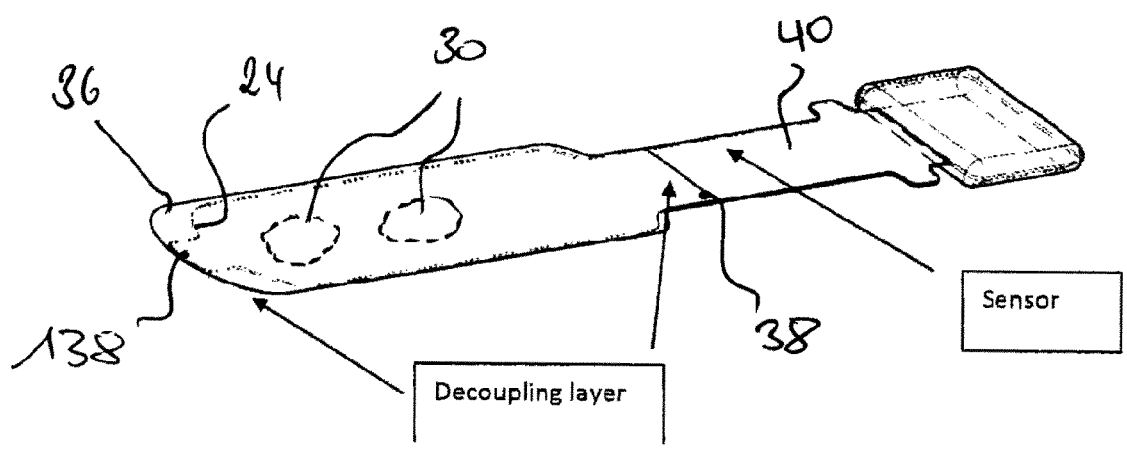
FIG. 2: a top view of an embodiment of an occupant sensor.

FIG. 2 shows a top view of the occupant sensor 10. It will be noted that a lateral dimension of said decoupling layer 36 is at least slightly larger than a lateral dimension of said top carrier foil 24 at least in the region of the active area 30. This effectively ensures that the switching element 22 will not extend laterally beyond the decoupling layer 36 and thus may not be bonded to the overlying seat layer 18 during the thermosetting stage. Furthermore the lager dimension of the decoupling layer provides for the required space in which the switching element may be freely displaced with respect to the decoupling layer.

It should be noted that the decoupling layer may be entirely separate from the switching element. In this case, the decoupling layer is placed on top of the switching element during the seat assembly prior to the arrangement of the next seat layer. In a shown embodiment however, the decoupling layer 36 is locally attached to the top carrier layer 24 in a region 38 and/or 138 remote from the active area. The decoupling layer may e.g. be attached to a connection tab 40 of the switching element 22, i.e. at a location which is distant to the active areas 30. By such a local attachment in a region remote from the active areas, the occupant sensor forms a single piece which substantially improves the handling of the occupant sensor while at the same time the lateral displaceability of the switching element with respect to the flexible decoupling layer is maintained.

The invention claimed is:

1. An occupant sensor comprising at least one switching element, said switching element comprising a top carrier layer and a bottom carrier layer arranged at a certain distance from one another by means of a spacer, said spacer comprising at least one opening defining an active zone of said switching element in which said top and bottom carrier layers may be brought together in response to a force acting on at least one of said top and bottom carrier layers, and an electrode arrangement comprising at least a first electrode and a second electrode arranged within said active zone of said switching element between said top and bottom carrier layers in such a way that an electrical contact is established between said first and second electrode if said top and bottom carrier layers are brought together in response to a force acting on at least one of said top and bottom carrier layers, wherein said occupant sensor comprises a decoupling layer of a flexible material, said decoupling layer being arranged on a top side of said switching element in such a way that said decoupling layer covers the top carrier layer at least in the region of the active zone, and wherein said decoupling layer and switching element are laterally displaceable with respect to each other at least in the region of the active zone.

2. The occupant sensor according to claim 1, wherein a lateral dimension of said decoupling layer is larger than a lateral dimension of said top carrier foil at least in the region of the active zone.

3. The occupant sensor according to claim 1, wherein said decoupling layer is locally attached to the top carrier layer in a region remote from the active zone.

4. The occupant sensor according to claim 1, wherein said switching element comprises a plurality of active zones arranged between said top and bottom carrier layers and wherein said decoupling layer is arranged to cover the top carrier layer in the region of said plurality of active zones.

5. The occupant sensor according to claim 1, wherein said switching element is configured as a foil-type pressure sensor.

6. The occupant sensor according to claim 1, wherein said top carrier layer and/or said bottom carrier layer is/are made of a polymer foil.

7. The occupant sensor according to claim 1, wherein said decoupling layer is made of a polymer foil or a textile material.

8. Seat assembly comprising a seat cushion, a seat cover and at least one occupant sensor according to claim 1, wherein said at least one occupant sensor is arranged between said seat cushion and said seat cover and wherein the decoupling layer of said at least one occupant sensor is at least partially bonded to said seat cover.

9. Seat assembly comprising a seat cushion, a seat heater layer, a seat cover and at least one occupant sensor according to claim 1, wherein said at least one occupant sensor is arranged between said seat cushion and said seat heater layer and wherein the decoupling layer of said at least one occupant sensor is at least partially bonded to said seat heater layer.

10. Seat assembly comprising a seat cushion, a felt layer or fabric layer, a seat cover and at least one occupant sensor according to claim 1, wherein said at least one occupant sensor is arranged between said seat cushion and said felt layer or fabric layer and wherein the decoupling layer of said at least one occupant sensor is at least partially bonded to said felt layer or fabric layer.

* * * * *